(12) United States Patent
Song et al.

(10) Patent No.: US 8,959,393 B2
(45) Date of Patent: Feb. 17, 2015

(54) CENTRALIZED AND NETWORKED PROTECTION SYSTEM AND METHOD OF A REGIONAL DISTRIBUTION NETWORK

(71) Applicants: XJ Group Corporation, Xuchang (CN); State Grid Corporation of China, Beijing (CN)

(72) Inventors: Xiaohui Song, Xuchang (CN); Xing Liu, Xuchang (CN); Yong Wei, Xuchang (CN); Dingguo Wang, Xuchang (CN); Jungang Li, Xuchang (CN)

(73) Assignees: XJ Group Corporation, Xuchang (CN); State Grid Corporation of China, Beijing (CN)

( * ) Notice: Subject to any disclaimer, the term of this patent is extended or adjusted under 35 U.S.C. 154(b) by 160 days.

(21) Appl. No.: 13/651,423

(22) Filed: Oct. 14, 2012

(65) Prior Publication Data

US 2013/0262922 A1    Oct. 3, 2013

(30) Foreign Application Priority Data

Mar. 27, 2012    (CN) .......................... 2012 1 0083627

(51) Int. Cl.
*G06F 11/00*    (2006.01)
*G06F 11/14*    (2006.01)
*G06F 11/30*    (2006.01)

(52) U.S. Cl.
CPC ........ *G06F 11/1441* (2013.01); *G06F 11/3058* (2013.01)

USPC ........................................................... 714/14

(58) Field of Classification Search
CPC . G06F 11/2015; G06F 11/30; G06F 11/1441; G06F 11/263; G06F 11/3409; G06F 11/3466; G06F 11/0793; G06F 11/0751
USPC .................................................. 714/14, 47.1
See application file for complete search history.

(56) References Cited

U.S. PATENT DOCUMENTS

2014/0039699 A1*    2/2014    Forbes, Jr. ..................... 700/286

* cited by examiner

*Primary Examiner* — Yair Leibovich

(57) ABSTRACT

The present invention relates to a centralized and networked protection system and method of regional distribution network, and belongs to the field of electrical system automation and relay protection. The protection system includes at least two centralized protection devices, an intelligent terminal and a communication network module, the centralized protection devices being communication with the intelligent terminal via the communication network module, the intelligent terminal being configured along with switching devices to distribute in each line section, for sampling data, backup protection and executing of tripping and closing commands, the centralized protection devices configured in the monitoring center of the regional distribution network, for generating differential protection elements based on the information sampled by the intelligent terminal and the topologic structure of the regional distribution network; and for determining the region where fault occurs and sending tripping and closing control commands.

10 Claims, 2 Drawing Sheets

CENTRALIZED AND NETWORKED PROTECTION SYSTEM AND METHOD OF A REGIONAL DISTRIBUTION NETWORK

CROSS-REFERENCE TO RELATED APPLICATION

This application claims the priority benefit of Chinese application no. 201210083627.9, filed on Mar. 27, 2012. The entirety of the above-mentioned patent application is hereby incorporated by reference herein and made a part of specification.

BACKGROUND OF THE INVENTION

1. Field of the Invention

The present invention relates to a centralized and networked protection system and method of a regional distribution network, and belongs to the field of electrical power system automation and relay protection.

2. Background of the Invention

To improve the supply reliability of a distribution network, ring network structures have been adopted in today's distribution architecture. In the ring network structure, as overcurrent protection is dominant, the constant values of the feed line out from substations and main lines of distribution network are hard to set, and neither the constant value nor the time delay can match for the feed line and the main lines. In addition, the access of distributed power supply changes original topological structure of a distribution network from a radiation structure from a single power supply to a mesh structure from multiple power supplies, which brings great effects on relay protection of the distribution network. Presently, the domestic distribution automation mostly uses a recloser and a sectionaliser, and feed-line automation based on communication. However, for important loads, these control manners inevitably have drawbacks like low degree of selection to remove faults, blackout of non-fault sections, high loss of switching devices and long time of fault processing.

BRIEF SUMMARY OF THE INVENTION

The object of the present invention is to provide a centralized and networked protection system and method of a regional distribution network, so as to solve the issues of low degree of selection to remove faults, high loss of switching devices, blackout of non-fault sections and long time of fault processing occurring in the protection process of existing regional distribution network.

To address the above technical issues, the present invention provides a centralized and networked protection system of a regional distribution network, the protection system comprises an centralized protection device, an intelligent terminal and a communication network module, wherein the centralized protection device communicates with the intelligent terminal via the communication network module; wherein the intelligent terminal is disposed along with switching devices and distributed in each line section; wherein the intelligent terminal includes a sampling module and an executing module, the sampling module is used for sampling currents and switching states of each section in the regional distribution network, and the executing module is used for executing fault startup and action commands after multi-frame confirming of them to isolate regional faults; wherein the centralized protection device is arranged in the monitoring center of the regional distribution network, and comprises a differential protection element generation module, a computation module, a judgment module and a fault startup and action command issuing module; wherein the differential protection element generation module is used to identify branches associated with each node based on the received current data and switching states and the electrically topological structure of the regional distribution network, determine minimum intervals of differential protection based on the generalized Kirchhoff's law, and generate a corresponding number of differential protection elements; wherein the computing module for is used to calculate the differential current and braking current of each differential protection element, the judgment module to judge whether differential current protection actions are needed based on differential curr ent and braking current of each differential protection element, the fault startup and action command issuing module to judge the areas where faults occur and send fault startup and action command to these areas; and wherein the communication network module is of a ring network structure.

The communication network module is a PTN optical fiber ring network and uses IEC61850 GSOOSE transmission protocol, and the centralized protection device and the intelligent terminal use IEC61850 GSOOSE protocol to transmit vector values and closing and tripping control commands.

The sampling module obtains synchronous clock for sampling by checking time with the IEEE 1588 network when sampling the current and switching states of the regional distribution network, makes sampling adjustment by using zero time of the clock as a reference, then calculates real-time magnitudes and angles of the three-phase current by a small vector algorithm, and labels the number of vectors by using the synchronous time as a reference.

The intelligent terminal uses multi-frame confirmation for protective startup commands. In case the sections of main lines within the protection scope are equipped with load switches, a strategy for isolating short current fault is to trip the corresponding feed line breaker of a substation and then to trip load switches of the fault area.

The present invention also provides a centralized and networked protection method of a regional distribution network, the protection method includes the following steps:

1) sampling the current and switching states of each section in the regional distribution network;

2) dynamically adjusting the electrically topological based on the sampled current data and switching states and the electrically topological structure of this regional distribution network; and generating a corresponding of differential protection elements;

3) calculating the differential current and braking current of each differential protection element;

4) judging whether differential current protection actions are needed based on the differential current and braking current of each differential protection element;

5) determining that a fault occurs in an area where the differential current and braking current of a certain differential protection element meet the action formula and there is no blocking signal, and respectively sending fault startup and action commands to this area;

6) driving a start-up relay after multi-frame confirmation of the fault start-up and action commands, and switching on the activating source of tipping relay to isolate this area.

The protection method comprises: when sampling the current and switching states of the regional distribution network in the step 1), obtaining synchronous clock for sampling by checking time with the IEEE 1588 network, making sampling adjustment by using zero time of the clock as a reference, then calculating real-time magnitudes and angles of the three-phase currents by a small vector algorithm, and labeling the number of vectors by using the synchronous time as a reference.

The protection method comprises: when sending the sampled current data and switching states in the step 1), the sampled current values and switching states are packaged in data frame to be sent according to IEC61850 GSOOSE protocol, the data frame also including the number of switch, the number of branch and the electrically topological information of the switching state corresponding to the intelligent terminal.

The protection method comprises: when generating a corresponding number of differential protection elements in the step 2), creating a mapping relationship between each differential protection element and the corresponding sampling terminal, switches number, sampled data, backup differential element, and breaker failing element.

The protection method comprises in the step 6): using multi-frame confirmation for protective startup commands for fault isolation; wherein in case the sections of main lines within the protection scope are equipped with load switches, a strategy of isolating short current fault is to send commands to trip feed line breaker of a substation and then trip load switches of the fault sections, then close feed line breaker to restore the supply to non-fault section, so as to ensure normal supply of the non-fault section.

The beneficial effects of present invention is that the invention treats a regional distribution network as a whole to conduct comprehensive protection and control, which shortens successive blackout time due to short current faults and improves the reliability of power supply. The present invention adopts the idea of distributed sampling and centralized handling to construct a centralized and networked protection system comprised of real-time data sampling terminal distributing in supply sections and configured along with switching devices, and a centralized protection device arranged in the control centre of the regional distribution network, in which data transmission network adopts a PTN based optical fiber ring network to ensure the real-time and reliability of data transmission.

DETAILED DESCRIPTION OF THE INVENTION

The specific embodiments of present invention are described in detail below in conjunction with drawings.

Figure 1:
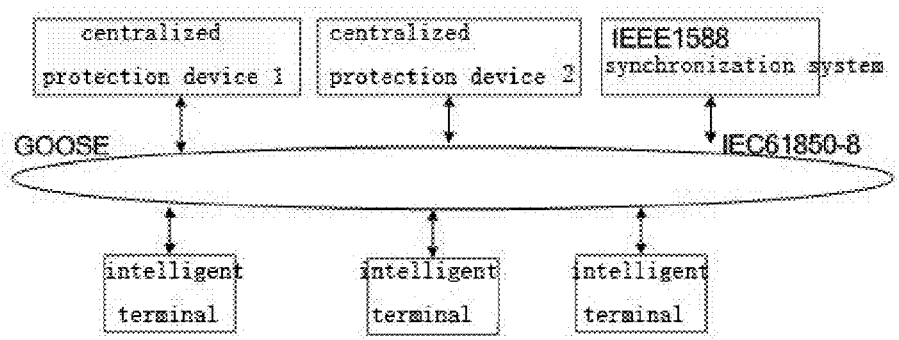
FIG. 1 is a structural diagram of a centralized and networked protection system of a regional distribution network of the present invention.

An embodiment of a centralized and networked protection system of a regional distribution network of the present invention:

As shown in FIG. 1, the networked protection system comprises a centralized network protection device, a communication network and intelligent terminals. The communication network is established between a distribution station and the intelligent terminals, to achieve centralized network protection and distribution automation. A centralized protection and control system uses the structure of distributed sampling and centralized handling. The centralized protection device uses dual redundant configurations and is disposed with the intelligent distribution station. The intelligent terminals, arranged along with the switches of supply sections of distribution network, are installed in field. The communication network is a PTN-based optical fiber ring network, and uses IEC61580 GSOOSE transmission protocol. Both centralized protection devices and the intelligent terminals use IEC61580 GSOOSE protocol to transmit vector values and tripping and closing control commands. The intelligent terminal includes a sampling module for sampling the current and switching states of each section in the regional distribution network, and an executing module for executing the commands for the protection device to achieve regional fault isolation after multi-frame confirmation. The centralized protection device comprises a differential protection elements generation module, a computation module, a judgment module and a fault startup and action command issuing module. The differential protection elements generation module dynamically adjusts the electrically topology based on the received current data and switching states and the electrically topological structure of this regional distribution network, and generates a corresponding of differential protection elements. The computation module calculates the differential current and braking current of each differential protection element. The judgment module judges whether differential current protection actions are needed based on the differential current and braking current of each differential protection element. The fault startup and action command issuing module judges the areas where faults occur, and sends fault startup and action commands to these areas. The system operates in the following manner.

1. Firstly, various intelligent terminals obtain synchronous clock for sampling by checking time with the IEEE 1588 network, a sampling interruption (with a sampling frequency of 4 k/s) makes a sampling adjustment by using zero time of the clock as a reference, then calculates real-time magnitudes and angles of the three-phase current by a small vector algorithm, and labels the number of vectors in synchronous time as a reference. These data are packaged in a data frame according to IEC61850 GSOOSE protocol, and the data frame also includes switch number, branch number, and the electrically topological information of the switching state corresponding to the intelligent terminal. The intelligent terminal also converts small vectors into the magnitudes of currents, and accomplishes inverse time delay overcurrent protection function by a standard inverse time delay curve. Small vector data are transmitted to the centralized protection device by using the PTN optical fiber ring network.

2. The centralized protection device acquires analog information sent by sampling terminals and dynamic electrically topological information, in combination with the downloaded electrically topology of the regional distribution network when put into operation, so as to form a branch-node link datasheet, and uses a depth-first search method to generate several differential protection elements, wherein a mapping relationship is established between each differential protection elements and the corresponding sampling terminal, switch number, sampling data, backup differential element, and breaker failing element.

3. Each differential protection element calculates differential current and braking current based on a small vector algorithm, and the differential element decides to use either two-end differentiation or multi-end differentiation based on the mapping relationship table. Formula 1 and 2 are respectively the action formula of two-end and multi-end differentiation, in which braking coefficient k of multi-end differentiation adaptively adjusts itself according to the number of measurement points involving in the calculation.

$$\begin{cases} I_d = |\dot{I}_1 + \dot{I}_2| > I_{SET} \\ I_d > K * I_r \end{cases} \quad (1)$$

where, $Ir = |\dot{I}_1 - \dot{I}_2|$, $k = 0.7$ $$\begin{cases} I_d = |\dot{I}_1 + \ldots + I_n| \\ I_d > k * I_r \\ I_r = k * \sum_1^n |I_n| \end{cases} \quad (2)$$

Formula 1 and 2 are respectively the action formula of two-end and multi-end differentiation, in which braking coefficient k of multi-end differentiation adaptively adjusts itself according to the number of measurement points involving in the calculation.

4. The differential protection element is provided with a fault startup judgment module and a differential judgment module. Upon determining that the intelligent terminals have started, the fault startup module immediately sends GOOSE commands of fault startup to corresponding intelligent terminal. The fault startup criteria is an abrupt current change in phase currents and the start state of abrupt current change determined by the intelligent terminal via instantaneous sampling value. If the differential current and braking current of certain differential protection element meet the action formula and there is no blocking signal, then a fault is determined to occur in this area, and tripping command signals are sent to the related intelligent terminal in this area respectively.

Figure 2:
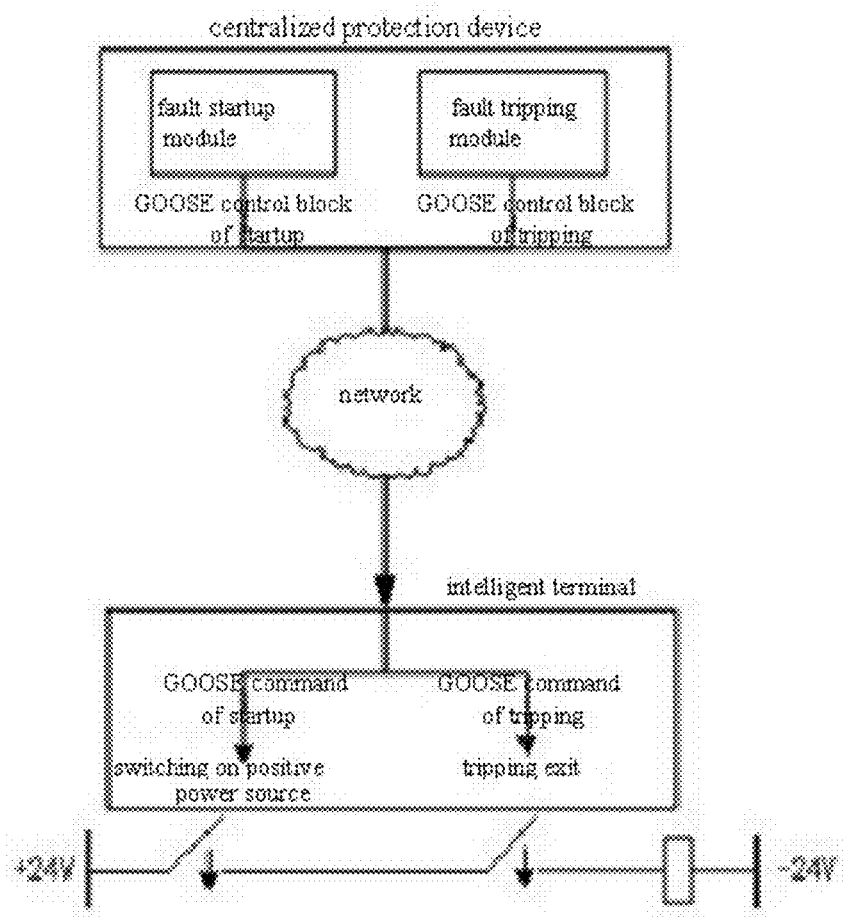
FIG. 2 is a strategical view of start-up and tripping commands in serial of centralized and networked protection system of the present invention.

5. Upon receiving a fault startup GOOSE command, the intelligent terminal drives start-up relay after multi-frame confirmation, switches on the activating source of tipping relay, and drives tripping relay after receiving tripping GOOSE command, as shown in FIG. 2. For the conditions of no blocking, the intelligent terminal trips corresponding switches to achieve the isolation of fault areas. If the switches refuse to act, faulty protective elements are generated according to dynamic topologic relations by the centralized protection device, and faulty protective elements corresponding to this switch are trigged. After a delay, adjacent switches in electrical relation with the faulty switch are tripped. If the intelligent terminal corresponding to this fault section becomes abnormal or communication interrupts, backup differentiation covering this fault section can still isolate the short current fault section after a short delay (the delay is considered according to the avoidance of protection and switching time).

The action time of the centralized current differential protection is less than 50 ms, and the time of tans-supply of power is in the order of subseconds. For the case where main lines are provided with breakers within the protection scope, the time for isolating short current fault is less than 120 ms (including 70 ms of switching time of breakers); for the case where main lines are provided with load switches within the protection scope, the time for isolating fault is less than 200 ms (including 70 ms of switching time of breakers and load switches).

An embodiment of a centralized and networked protection method of a regional distribution network of present invention:

This method enables centralized and networked protection and distribution automation by using the idea of distributed sampling and centralized handling. The communication network of the regional distribution network is a PTN-based optical fiber ring network, and uses IEC61850 GSOOSE transmission protocol. Particular steps are as follows:

1. Synchronous clock for sampling is obtained by checking time with the IEEE 1588 network, sampling interruption (with a sampling frequency of 4 k/s) makes a sampling adjustment by using zero time of the clock as a reference, then calculates real-time magnitudes and angles of the three-phase current by a small vector algorithm and labels the number of vectors in synchronous time as a reference. The sampled data are packaged in a data frame according to IEC61850 GSOOSE protocol, the transmission interval is 5 ms, and the data frame further includes the switch number, branch number, the switching state and the electrically topological information corresponding to the intelligent terminal. The intelligent terminal also converts small vectors into the magnitudes of currents, and accomplishes inverse time delay overcurrent protection function by a standard inverse time delay curve.

2. By using the acquired analog information sent by sampling terminals and dynamic electrically topological information, in combination with the downloaded electrically topology of the regional distribution network when put into operation, a branch-node link data sheet is formed, and by using a depth-first search method, several differential protection elements are generated, thus forming a mapping relationship between each differential protection element and the corresponding sampling terminal, switch number, sampling data, backup differential element and breaker failing element, etc.

3. By using a small vector algorithm for each differential protection element, the differential current and braking current is calculated. The differential element decides to use either two-end differentiation or multi-end differentiation based on the mapping relationship. Formula 1 and 2 are respectively the action formula of two-end or multi-end differentiation, in which braking coefficient k of multi-end differentiation adaptively adjusts itself according to the number of measurement points involving in the calculation.

$$\begin{cases} I_d = |\dot{I}_1 + \dot{I}_2| > I_{SET} \\ I_d > K * I_r \end{cases} \quad (1)$$

where, $\text{Ir}=|\dot{I}_1-\dot{I}_2|$, $k=0.7$, $I_d$ is the differential current, and $I_r$ is the braking current.

$$\begin{cases} I_d = |\dot{I}_1 + \ldots + I_n| \\ I_d > k * I_r \\ I_r = k * \sum_1^n |I_n| \end{cases} \quad (2)$$

4. A fault judgment is made. The fault startup criteria is an abrupt current change in phase current and the start state of abrupt current change determined by the intelligent terminal via instantaneous sampling values. If the differential current and braking current of a certain differential protection element meet the action formula and there is no blocking signal, then a fault is determined to occur in this area, and fault startup and action dual command signals are sent to the related intelligent terminal in this area.

5. Upon receiving a fault startup GOOSE command, the start-up relay is driven after multi-frame confirmation, and the activating source of tipping relay is switched on, and upon receiving a tripping GOOSE command, the tripping relay is driven, as shown in FIG. 2. For the condition of no blocking, respective switches are tripped to achieve the isolation of a fault region. If the switches refuse to act, faulty protective elements are generated according to a dynamic topologic relationship, faulty protective elements corresponding to this switch are triggered. After a delay, adjacent switches in electrical relation with the faulty switch are tripped. If the intelligent terminal corresponding to this fault section becomes abnormal or communication interrupts, backup differentiation protection covering this fault section can still isolate the short current fault section after a short delay (the delay is considered according to the avoidance of protection and switching time).

Figure 3:
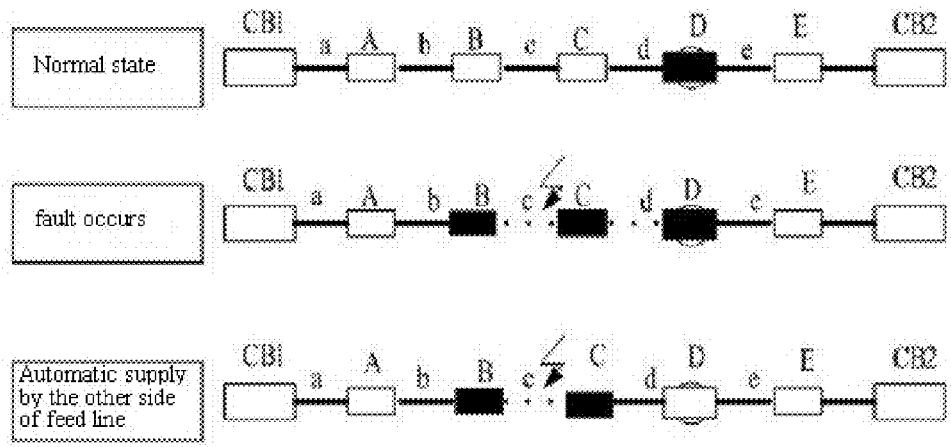
FIG. 3 is a flowchart of fault isolation and trans-supply of power of the present invention where main lines use a mode of breakers.

For the case where various supply sections are provided with breakers in the overall distribution network, as shown in FIG. 3, in normal operation, the linkage switch D is in off state. If a short current fault occurs in section c, the centralized protection system acts after 50 ms, and trips switches B and C after 100 ms. After a delay, the linkage switch D is reclosed to achieve trans-supply of power by the other side of the feed line, thus ensuring the power supply to the users by supply section d.

Figure 4:
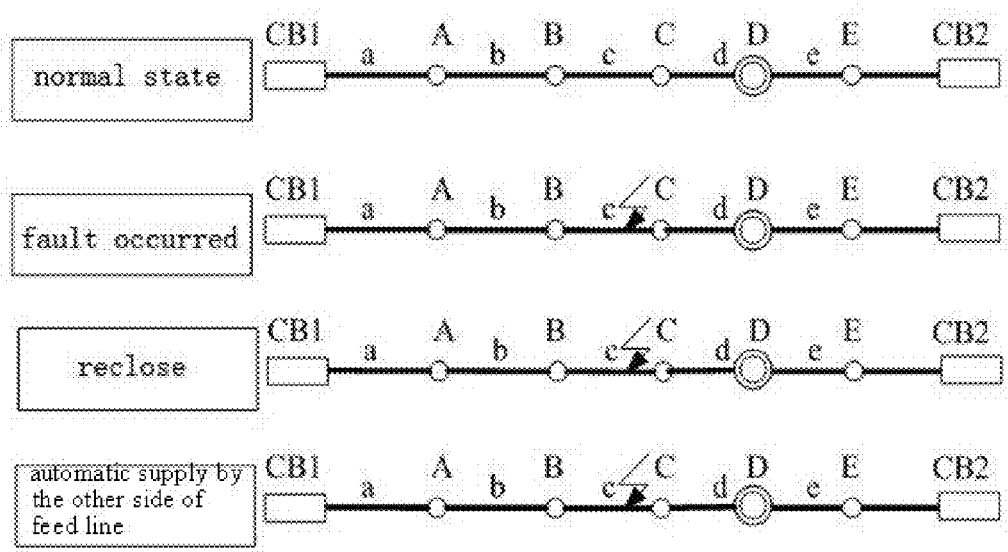
FIG. 4 is a flowchart of fault isolation and trans-supply of power of the present invention where main lines use a mode of load switches.

For the case where various supply sections are provided with load switches in the overall distribution network, as shown in FIG. 4, in normal operation, the linkage switch D is in off state. If a short current fault occurs in section c, the centralized protection system acts after 50 ms, and trips the feed-line breaker CB1 of substation after 120 ms, then trips load switches B, C to isolate a fault section, then reclose the feed-line breaker CB1 and linkage switch D, to achieve trans-supply of power by the other side of the feed line, thus ensuring the power supply to the users by supply sections a, b and d.

The present invention uses a safety scheme of protection start-up and tripping dual commands by intelligent terminals and centralized protection devices, and intelligent terminals uses multi-frame confirmation for protection start-up commands. For the case where various sections of main line within protection scope are configured with load switches, the strategy of isolating short current fault is to send commands to trip respective feed-line breaker of substation and then trip load switches of fault area. Where supply sections are configured with breakers, the breakers are directly tripped, cutting off fault current. Except blackout occurs to users in fault region, other users in the line are not affected by the blackout. The action time of the centralized current differential protection is less than 50 ms, the time for tans-supply of power is in the order of subseconds. For the case where main lines are configured with breakers within protection scope, the time for isolating short current fault is less than 120 ms (including 70 ms of switching time of breakers); for the case where main lines are configured with load switches within protection scope, the time for isolating fault is less than 200 ms (including 70 ms of switching time of breakers and load switches).

What is claimed is:

1. A centralized and networked protection system of a regional distribution network, characterized in that the protection system comprises a centralized protection device, an intelligent terminal and a communication network module, wherein the centralized protection device communicates with the intelligent terminal via the communication network module; wherein the intelligent terminal is disposed along with switching devices and distributed in each line section of line sections; wherein said intelligent terminal includes a sampling module and an executing module, the sampling module samples currents and switching states of each section of sections in the regional distribution network, and the executing module is used for executing fault startup and action commands after multi-frame confirming of them to isolate regional faults; wherein said centralized protection device is arranged in a monitoring center of the regional distribution network, and comprises a differential protection element generation module, a computation module, a judgment module and a fault startup and action command issuing module; wherein the differential protection element generation module is used to identify branches associated with each node based on current data and switching states sampled by sampling module and an electrically topological structure of the regional distribution network, determine minimum intervals of differential protection based on a generalized Kirchhoff's law, and generate a corresponding number of differential protection elements; wherein the computing module is used to calculate the differential current and braking current of each differential protection element, the judgment module to judge whether differential current protection actions are needed based on differential current and braking current of each differential protection element, the fault startup and action command issuing module is to judge areas where faults occur and send fault startup and action command to these areas; and wherein said communication network module is of a ring network structure.

2. The protection system according to claim 1, characterized in that said communication network module is a PTN optical fiber ring network, and uses IEC61850 GSOOSE transmission protocol, and that said centralized protection device and said intelligent terminal use IEC61850 GSOOSE protocol to transmit vector values and closing and tripping control commands.

3. The protection system according to claim 1, characterized in that said intelligent terminal uses multi-frame confirmation for protective startup commands; and in case the sections of main lines within the protection scope are equipped with load switches, a strategy for isolating short current fault is to trip the corresponding feed line breaker of a substation and then to trip load switches of the fault area.

4. The protection system according to claim 1, characterized in that said sampling module obtains synchronous clock for sampling by checking time with the IEEE 1588 network when sampling the current and switching states of the regional distribution network, makes sampling adjustment by using zero time of the clock as a reference, then calculates real-time magnitudes and angles of the three-phase current by a small vector algorithm, and labels the number of vectors by using the synchronous time as a reference.

5. The protection system according to claim 2, characterized in that said sampling module obtains synchronous clock for sampling by checking time with the IEEE 1588 network when sampling the current and switching states of the regional distribution network, makes sampling adjustment by using zero time of the clock as a reference, then calculates real-time magnitudes and angles of the three-phase current by a small vector algorithm, and labels the number of vectors by using the synchronous time as a reference.

6. A centralized and networked protection method of a regional distribution network, characterized in that the protection method includes the following steps:
 1) sampling the current and switching states of each section in the regional distribution network;
 2) identifying branches associated with each node based on current data and switching states sampled by sampling module and an electrically topological structure of the regional distribution network, determining minimum intervals of differential protection based on a generalized Kirchhoff's law, and generating a corresponding number of differential protection elements;

3) calculating differential current and braking current of each differential protection element;

4) judging whether differential current protection actions are needed based on the differential current and braking current of each differential protection element;

5) determining that a fault occurs in an area where the differential current and braking current of a certain differential protection element meet an action formula and there is no blocking signal, and sending fault startup and action commands to this area;

6) driving a start-up relay after multi-frame confirmation of the fault start-up and action commands, and switching on a tipping relay to isolate this area.

7. The protection method according to claim 6, characterized in that when sampling the current and switching states of the regional distribution network in said step 1): obtaining synchronous clock for sampling by checking time with the IEEE 1588 network, making sampling adjustment by using zero time of the clock as a reference, then calculating real-time magnitudes and angles of the three-phase currents by a small vector algorithm, and labeling the number of vectors by using the synchronous time as a reference.

8. The protection method according to claim 6, characterized in that when sending the sampled current data and switching states in said step 1): packaging the sampled current values and switching states in a data frame according to IEC61850 GSOOSE protocol, wherein the data frame further includes switch number, branch number, and the electrically topological information of the switching state corresponding to the intelligent terminal.

9. The protection method according to claim 6, characterized in that when generating a corresponding number of differential protection elements in said step 2): creating a mapping relationship between each differential protection element and the corresponding sampling terminal, switch number, sampled data, backup differential element, and breaker failing element.

10. The protection method according to claim 6, characterized in that in said step 6): using multi-frame confirmation for protective startup commands for fault isolation, wherein in case the sections of main lines within the protection scope are equipped with load switches, a strategy of isolating short current fault is to send commands to trip feed line breaker of a substation and then trip load switches of the fault sections, then close feed line breaker to restore the supply to non-fault section, so as to ensure normal supply of the non-fault section.

* * * * *